United States Patent
Yamamoto

[19]

[11] Patent Number: 6,104,676
[45] Date of Patent: Aug. 15, 2000

[54] APPARATUS FOR REPRODUCING MAGNETO-OPTICAL INFORMATION UTILIZING MAGNETIC DOMAIN DISPLACEMENT, METHOD THEREFOR, AND METHOD FOR INFORMATION RECORDING

[75] Inventor: Masakuni Yamamoto, Yamato, Japan

[73] Assignee: Canon Kabushiki Kaisha, Tokyo, Japan

[21] Appl. No.: 09/160,382

[22] Filed: Sep. 25, 1998

[30] Foreign Application Priority Data

Sep. 26, 1997 [JP] Japan ................................. 9-261844
Sep. 9, 1998 [JP] Japan ................................ 10-255172

[51] Int. Cl.[7] .................................................. G11B 11/00
[52] U.S. Cl. .............................................................. 369/13
[58] Field of Search .............................. 369/13, 14, 110, 369/116, 59, 58; 360/59, 114; 365/122

[56] References Cited

U.S. PATENT DOCUMENTS 4,835,759  5/1989  Saito et al. ................................. 369/59
5,412,626  5/1995  Ohno et al. ................................ 369/13
5,450,381  9/1995  Tsukamura et al. ...................... 369/13
5,581,532  12/1996  Matsumura et al. .................... 369/110
5,825,742  10/1998  Tanaka et al. .......................... 369/116
5,883,863  3/1999  Itakura et al. ............................ 369/13

FOREIGN PATENT DOCUMENTS 6-290496  10/1994  Japan .

*Primary Examiner*—Tan Dinh
*Attorney, Agent, or Firm*—Fitzpatrick, Cella, Harper & Scinto

[57] ABSTRACT

A magneto-optical information reproducing apparatus and method reproduces information by displacement of a domain wall of a magnetic domain recorded by mark-edge recording on a recording medium. The apparatus applies a magnetic field for reproduction, extracts a signal produced by displacement of a domain wall of one of a front edge and a rear edge of a magnetic domain, then optionally reverses the direction of the magnetic field, and extracts a signal produced by displacement of the domain wall at the other edge. The apparatus may also synthesize a signal produced by displacement of a domain wall at the front edge with a signal produced by displacement of a domain wall at the rear edge, with the synthesized signal being used as the reproduced signal.

9 Claims, 10 Drawing Sheets

FIG. 3A
PRIOR ART
FIG. 3B
PRIOR ART
FIG. 3C
PRIOR ART
FIG. 3D
PRIOR ART
FIG. 3E
PRIOR ART
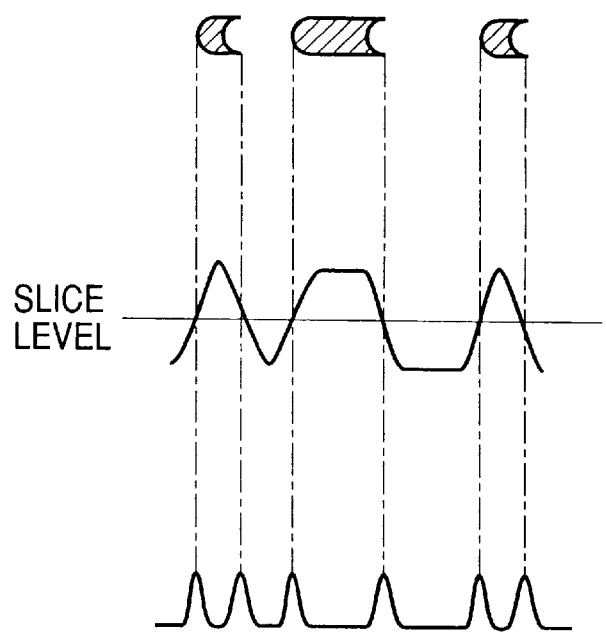
SLICE LEVEL

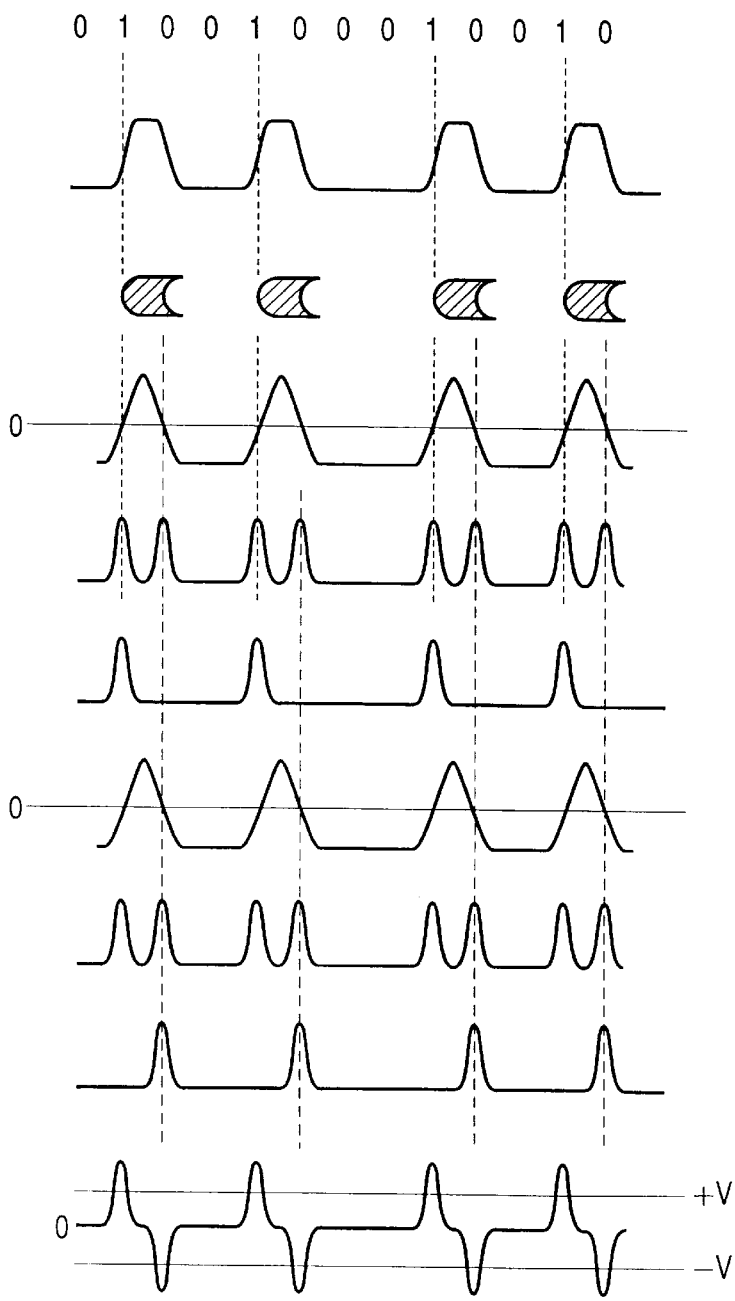

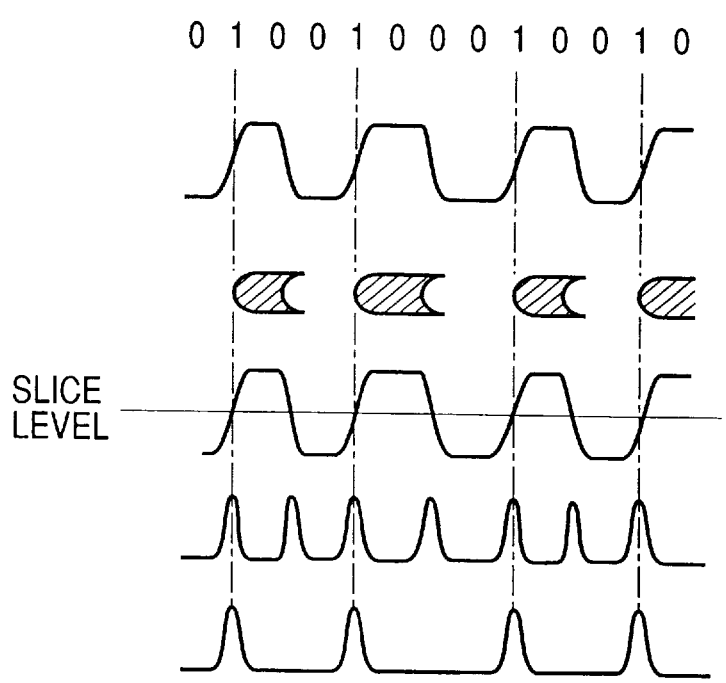

APPARATUS FOR REPRODUCING MAGNETO-OPTICAL INFORMATION UTILIZING MAGNETIC DOMAIN DISPLACEMENT, METHOD THEREFOR, AND METHOD FOR INFORMATION RECORDING

BACKGROUND OF THE INVENTION

1. Field of the Invention

The present invention relates to a method for reproducing magneto-optical information recorded by a mark-edge recording method on a recording medium by utilizing domain wall displacement, an apparatus therefor, and a method for the produced information.

2. Related Background Art

The magneto-optical information recording-reproduction apparatus employing a magneto-optical disk is promising because of the portability, large memory capacity, information erasability, rewritableness and so forth. FIG. 1 shows an optical head of a conventional apparatus for reproducing magneto-optical memory. In FIG. 1, a divergent light flux emitted from semiconductor laser 12 is paralleled by collimator lens 13, and is converted into a parallel luminous flux having a circular cross-section by beam correction prism 14. The linear polarized light components orthogonal to each other are named P-polarized light and S-polarized light respectively in the present invention. The P-polarized light flux is linear polarized light parallel to the drawing sheet face of FIG. 1. The P-polarized light flux is introduced to polarized light beam splitter 15. The polarized light beam splitter has a property, for example, such that it allows the P-polarized light to pass through at a transmittance of 60% and reflects the P-polarized light at a reflectivity of 40%, whereas it intercepts the S-polarized light at a transmittance of 0%, and reflects the S-polarized light at a reflectivity of 100%. The P-polarized light flux having passed through polarized light beam splitter 15 is condensed by objective lens 16 to be projected as a fine light spot onto a magnetic layer of magneto-optical disk 17. To this projected light spot area, an external magnetic field is applied by magnetic head 18 to record a magnetic domain (a mark) on the magnetic layer.

The reflected light from magneto-optical disk 17 is returned through objective lens 16 to polarized light beam splitter 15. A part of the reflected light is separated and introduced to an optical reproduction system, where the introduced light flux is further separated by another light beam splitter 19. Polarized light beam splitter 19 has a property, for example, such that it allows the P-polarized light to pass through at a transmittance of 20% and reflects the P-polarized light at a reflectivity of 80%, whereas it intercepts the S-polarized light at a transmittance of 0%, and reflects the S-polarized light at a reflectivity of 100%. The one light flux separated by polarized light beam splitter 19 is introduced through condenser lens 25 to half prism 26, where it is further separated into two fluxes, one being introduced to photodetector 27, and the other being introduced through knife edge 28 to photodetector 29. Such optical control systems make error signals for auto-tracking and auto-focusing of the light spot.

The other light flux separated by polarized light beam splitter 19 is introduced to polarized light beam splitter 22 through halfwave plate 20 for changing the light flux polarization direction by 45° and condenser lens 21 for condensing the light flux. In polarized beam splitter 22, the introduced light flux is separated into two fluxes. The separated light fluxes are respectively detected by photodetector 23 or 24. Polarized light beam splitter 22 has transmittance of 100% and reflectivity of 0% for the P-polarized light, and transmittance of 0% and reflectivity of 100% for S-polarized light. The differential of the signals detected by photodetector 23 and 24 is detected by a differential amplifier (not shown in the drawing) to produce a reproduced signal.

A magneto-optical medium records information by a change of vertical magnetization directions. When a linear polarized light is projected onto a magneto-optical medium having information recorded by the change of magnetization direction, the polarization direction of the reflected light turns in a dextro direction or in a levo direction depending on the magnetization direction. For example, as shown in FIG. 2, the linear polarized light of the P-axis direction turns by an angle of +θk to the direction R+ by reflection for downward magnetization, and turns by an angle of −θk to the direction R− by reflection for upward magnetization. In FIG. 2, axis S is an axis for S polarized light direction. Points S+ and S− on axis S are S coordinates of points R+ and R− when letting the coordinates of points R+ and R− be (P+, S+) and (P+, S−) in P-S coordination system, respectively.

With an analyzer placed in the direction shown in FIG. 2, the light passing through the analyzer comprises the component A for R+, and the component B for R−. Therefore, the information can be detected by the photodetectors as the difference in the light intensity. In the example of FIG. 1, polarized light beam splitter 22 serves as the analyzer, in the direction of +45° to the P axis for the one separated light flux, and −45° to the P axis for the other separated light flux. The signal component detected by photodetector 23, and that detected by photodetector 24 are opposite in phase to each other. Therefore, the reproduction signal can be obtained with less noise by detecting differentially the individual signals.

Recently, for higher recording density of the magneto-optical medium, the system for the recording of magnetic domains (marks) is changing from pit-position recording to pit-edge recording. FIGS. 3A to 3E compares the two recording systems. FIG. 3A illustrates a row of pits recorded by pit position recording. FIG. 3B illustrates the detection signal of the pit row. In the pit position recording, information is recorded at the center of the magnetic domain. Although the recording is made at the magnetic domains of approximately the same size, the magnetic domains vary in size owing to the recording sensitivity of the medium. However, the positions of the centers are fixed without fluctuation, so that the information can be recorded precisely, advantageously. Therefore, early apparatuses employed the pit position recording system.

On the other hand, FIG. 3C illustrates a pit row in the pit edge recording. FIG. 3D illustrates the detection signal therefor. FIG. 3E illustrates pit edge detection signals. The edge detection signal detects zero-cross points of the detecting signal and the slice level (zero level) as shown in FIG. 3D. In the pit edge recording, the information is recorded at the edge (boundary) of the magnetic domain. A larger amount of information can be recorded in a unit area by the pit edge recording than by the pit position recording. Since the variation of the medium has lessened with recent techniques, the magneto-optical recording system is shifting from the pit position recording to the pit edge recording.

In conventional recording systems, the recording density of the optical disk like a magneto-optical medium generally depends on the laser wavelength and the NA (numerical aperture) of the objective lens of the optical reproduction system. The diameter of the light spot depends on the laser wavelength λ and the NA of the objective lens. The size of the reproducible magnetic domain is limited approximately to λ/2NA. Accordingly, in conventional optical disk, for higher recording density, the laser wavelength is made shorter, or the NA of the objective lens is made larger. However, improvement by the laser wavelength and the NA of the objective lens is naturally limited, so that techniques are being developed for improvement of the recording density by constitution of the recording medium and the reading system.

For example, Japanese Patent Application Laid-Open No. 6-290496 discloses a domain wall displacement reproduction system. In this system, a light spot is allowed to scan tracks on a magneto-optical medium constituted of laminated magnetic layers to transfer magnetic domains formed by vertical magnetization in a first magnetic layer onto a third magnetic layer opposing the first magnetic layer with interposition of a second magnetic layer provided for controlling the exchange coupling. Thereby, the magnetic domain recorded on the first magnetic layer is expanded, and therefrom a reproduction signal is obtained.

The domain wall displacement reproduction system is explained by reference to FIGS. 4A to 4D. FIG. 4A is a sectional view illustrating construction of a magnetic layer of a recording medium. FIG. 4B is a plan view taken from a light spot-projecting side of the magnetic layer. In the drawings, the numeral 30 indicates magnetic layers of a magneto-optical disk as a magneto-optical medium without showing the substrate, a protection layer and so forth. First magnetic layer 31 is a memory layer for recording information by magnetic domains. (The first magnetic layer 31 is hereinafter referred to as a memory layer). Second magnetic layer 32 is a switching layer for controlling the exchange coupling force between memory layer 31 and third magnetic layer 33. (The second magnetic layer is hereinafter referred to as a switching layer.) Third magnetic layer 33 is a displacement layer to which the magnetic domains are transferred from memory layer 31 by the action of switching layer 32 and by utilizing thermal distribution caused by the light spot, and enlarges the size of the magnetic domains by displacement of the magnetic wall of the transferred magnetic domain to be larger than the size of the magnetic domains recorded in memory layer 31. (The third magnetic layer 33 is hereinafter referred to as a displacement layer.) The numeral 34 indicates a light spot for reproduction. The numeral 35 indicates a track for reproduction on magneto-optical disk 30. The arrows in memory layer 31, switching layer 32 and memory layer 33 show the directions of atomic spin in the respective layers. Domain walls 36 are formed at the boundaries where the direction of the spin is reversed in the layers. The numeral 37 shows a domain wall of a magnetic domain transferred to displacement layer 33 which wall is about to be moved.

FIG. 4C shows temperature distribution caused in magneto-optical disk 30. Axis T means temperatures of this medium. Axis X means positions. The reproduction by domain wall displacement may be conducted either by one light spot or by two light spots in principle. For simplicity of the explanation, a two-light spot method is described. In FIGS. 4A and 4B, only the light spot contributing signal reproduction is shown. Another light spot (not shown in the drawing) is projected to cause temperature distribution shown in FIG. 4C. At position Xs, the temperature Ts of disk 30 is nearly the Curie temperature of switching layer 32. The shadowed area 38 in FIG. 4A is the region where the temperature is not lower than the Curie temperature of switching layer 32.

FIG. 4D shows distribution of the domain wall energy density σ1 in displacement layer 33 corresponding to the temperature distribution shown in FIG. 4C. Axis σ means domain wall energy densities. Axis F means forces exerted to the domain wall. Such a gradient of domain wall energy density σ1 in X direction exerts force F1 as shown in FIG. 4D to the domain walls at position X in the respective layers. Force F1 serves to displace the domain walls toward lower domain wall energy portion. In displacement layer 33 where the domain wall coercivity is low and the mobility of the domain wall is high, the domain wall is displaced readily only by this force F1. However, in the region before position Xs (righthand in FIGS. 4C and 4D), the temperature of the magneto-optical disk 30 is lower than Ts, so that the domain wall in the displacement layer is fixed by exchange coupling at the same position as the corresponding domain wall of memory layer 31.

In FIG. 4A, domain wall 37 is placed at position Xs. At position Xs, the temperature of magneto-optical disk 30 rises to a temperature Ts approximate to Curie temperature of switching layer 32, and thereby the exchange coupling between displacement layer 33 and memory layer 31 is broken. Then, domain wall 37 at position Xs in displacement layer 33 will be displaced instantaneously to the region having a higher temperature and a lower domain wall energy density. Therefore, with the passage of reproducing light spot 34, the atomic spins in displacement layer 33 within the light spot are all directed to the one direction as shown in FIG. 4A. Thus, with the movement of the medium, domain wall 37 (or 36, etc.) is displaced instantaneously, and the atomic spins in the light spot are all directed to the same direction.

From the light reflected by magneto-optical disk 30, a reproducing signal is detected by differential detection in the same manner as conducted in the optical head of FIG. 1. In the domain wall displacement reproduction, the signals reproduced by the light spot have a constant amplitude independently of the magnetic domain sizes recorded in memory layer 31, because of arrangement of atomic spins in one direction, whereby the waveform interference caused by optical diffraction limit is prevented. In other words, reproduction by domain wall displacement enables reproduction of magnetic domain of sub-micron linear density, smaller than the size of resolution limit λ/(2NA) decided by the laser wavelength λ and NA of the objective lens.

FIG. 5 shows an example of an optical head applicable to domain wall displacement reproduction by a two-light spot method. In FIG. 5, semiconductor laser 39 for record reproduction, having for example a wavelength of 780 nm, and another semiconductor laser 40 for heating, having for example a wavelength of 1.3 μm, are both placed so as to project P-polarized light to a recording medium. The laser beams emitted from semiconductor lasers 39 and 40 are made nearly circular by beam-forming means not shown in the drawing, and converted to a parallel light fluxes by collimator lenses 41 and 42. Dichroic mirror 43 is designed to transmit light of 780 nm with 100% transmittance, and to reflect light of 1.3 μm with 100% reflectivity. Polarized light splitter 44 is designed to transmit P-polarized light with transmittance of 70 to 80%, but to reflect S-polarized light perpendicular to P-polarized light at reflectivity of about 100%.

The parallel light fluxes emitted from collimator lenses 41 and 42 are introduced through dichroic mirror 43 and polarized light splitter 44 to objective lens 45. The light flux of 780 nm is adjusted to be larger than the size of the aperture of the objective lens 45, and the light flux of 1.3 μm is adjusted to be smaller than the size of the aperture of objective lens 45. Therefore, the same objective lens 45 has a smaller NA of the lens for the light flux of 1.3 μm, and the size of the light spot thereof on recording medium 46 is larger than that of 780 μm. The reflected light from the recording medium is changed again to a parallel light flux, and reflected by polarized beam splitter 44 to form light flux 47. From light flux 47, servo error signals or information reproduction signals are derived after wavelength separation or a like treatment to light flux 47 by optical systems not shown in the drawing in the same manner as in a conventional system.

FIGS. 6A and 6B show the relation between the record-reproducing light spot and the heating light spot on the recording medium. In FIG. 6A, the numeral 48 indicates a record-reproducing light spot having wavelength of 780 μm; 49, a heating light spot having wavelength of 1.3 μm; 50, a domain wall of a magnetic domain recorded on land 51; 52, a groove; and 53, an area of higher temperature formed by heating light spot 49. Record-reproducing light spot 48 and heating light spot 49 overlap with each other on land 51 formed between grooves 52. Thereby, temperature gradient is formed on the moving recording medium as shown in FIG. 6B. The temperature gradient and record-reproducing light spot 48 are in the same relation as in FIGS. 4A to 4D. Thereby, information reproduction can be practiced by utilizing the domain wall displacement. As described above, the reproduction by the domain wall displacement may be conducted by a one-beam method or a two-beam method. The one-beam method is preferred in view of simplicity of the apparatus, but has disadvantages mentioned below.

FIGS. 7A and 7B show the principle of reproduction by domain wall displacement. FIG. 7A is a sectional view of the magnetic layer of magneto-optical disk 30 similar to that in FIG. 4A. The magnetic layer is constituted of memory layer 31, switching layer 32, and displacement layer 33. FIG. 7B is a plan view taken from the light spot-introducing side, showing land 51 of the track, grooves 52, and light spot 54 for reproduction. The projection of light spot 54 causes temperature distribution as shown by egg-shaped contour lines. The medium is moved in the direction shown by arrow mark A. Arrow marks in the magnetic layers of magneto-optical disk 30 show the directions of atomic spins. Region 57 is at a temperature higher than the Curie temperature of switching layer 32, thereby switching layer 32 in that region being demagnetized. As the result, at the higher temperature region 57, the exchange-coupling between memory layer 31 and displacement layer 33 is broken without transfer of the magnetic domains in memory layer 31 to displacement layer 33. Except for this higher temperature region 57, the magnetic domains of memory layer 31 are transferred to displacement layer 33 under action of exchange-coupling force.

When domain walls 55 and 56 of recorded magnetic domains have reached the boundaries of higher temperature region 57, the domain wall 55 moves in the direction shown by arrow mark B toward the higher temperature region, and domain wall 56 moves in the direction shown by arrow mark C toward the higher temperature region. Domain wall 55 moves to region 58 (hereinafter referred to as a front region), and domain wall 56 moves to region 59 (hereinafter referred to as a rear region). As shown in FIG. 7B, a conventional differential detection method reproduces a mixture of the information of domain wall 55 and domain wall 56 without giving the desired information.

This problem, described in FIGS. 7A and 7B, is discussed in more detail by reference to FIGS. 8A to 8G. FIGS. 8A to 8F show scanning of land 51 on the track by reproducing light spot 54. The medium is being driven in a direction shown by arrow mark A similarly as in FIGS. 7A and 7B with formation of front region 58 and rear region 59. Isolated magnetic domain (mark) 60 is recorded on land 51. For example, the case is considered where only the isolated magnetic domain 60 is magnetized upward, and the other magnetic domains are magnetized downward. The numerals 61 and 62 indicate respectively the front domain wall and the back domain wall. FIG. 8G shows reproduced waveforms of a differential signal at the respective positions.

FIG. 8A shows the state of light spot 54 apart from isolated magnetic domain 60. In this state, both front region 58 and rear region 59 are magnetized downward, and the differential detection signal is at the base level as shown in FIG. 8G. FIG. 8B shows the state in which light spot 54 has come close to isolated magnetic domain 60. In this state, domain wall 61 has not reach yet front region 58, and the differential detection signal is at the base level as in FIG. 8A.

FIG. 8C shows the state in which domain wall 61 has just reached the boundary between front region 58 and the low temperature area. In this state, domain wall 61 of displacement layer 33 in front region 58 moves to a higher temperature region, and dotted line-shadowed portion 63 comes to be magnetized upward. The differential detection signal comes to the high level as shown in FIG. 8G. FIG. 8D shows the state in which domain wall 62 of the opposite side has reached the boundary between front region 58 and the low temperature area. In this state, domain wall 62 of displacement layer 33 in front region 58 moves to a higher temperature region to be magnetized downward, the differential detection signal returning to the base level as shown in FIG. 8G.

FIG. 8E shows the state in which light spot 54 proceeds further and domain wall 61 has reached the boundary between rear region 59 and the low temperature area. In this state, domain wall 61 of displacement layer 33 in rear region 58 moves to a higher temperature region, and dotted line-shadowed portion 64 comes to be magnetized upward. The differential detection signal comes to the middle level as shown in FIG. 8G. The signal level is lower than that of front region 58 because the center of the high temperature region is behind the center of light spot 54. FIG. 8F shows the state in which domain wall 62 of the opposite side has reached the boundary between rear region 59 and the low temperature area. In this state, domain wall 62 of displacement layer 33 in rear region 59 moves to a higher temperature region to change the magnetization direction downward, with the differential detection signal returning to the base level as shown in FIG. 8G.

In a one-beam method of domain wall displacement reproduction as described above, the domain walls are displaced in both the front region and the rear region to give two pulses for one isolated magnetic domain. In practical signals, since the magnetic domains are recorded arbitrarily, the displacements of the domain walls in the front region and the rear region contribute complicatedly to the differential detection signal, and such signals as a result of the complicate contributions cannot readily be separated.

The inventors of the present invention already applied for a patent on one method for solving the above problem (Japanese Patent Application No. 9-235885). This method is described briefly below by reference to FIGS. 7A and 7B and FIGS. 8A to 8G. As known by the figures, an exchange-coupled domain wall is delivered from the low temperature area to front region 58. On the other hand, at rear region 59, the domain wall is re-transferred at the boundary between the region and the low temperature area, and the domain wall is driven out toward the low temperature area. In this method, by application of a magnetic field, the re-transfer position is shifted from rear region 59 to the low temperature area to prevent movement of the domain wall within rear region 59.

In the above-mentioned method of applying a constant magnetic field, however, the accuracy of the movement of the domain wall (jitter) varies depending on the magnetization direction of the expanding magnetic domain. In the expansion of the magnetic domain magnetized in the same direction as the applied magnetic field, the external magnetic field serves to help the expansion to improve the accuracy of the movement, resulting in the decrease of the jitter. On the other hand, in expansion of the magnetic domain magnetized in the reverse direction to the applied magnetic field, the external magnetic field serves to retard the expansion to lower the accuracy of the movement, resulting in the increase of the jitter. Accordingly, in the pit-edge recording system for recording on a memory layer, as shown in FIGS. 3C to 3E, the jitter is satisfactory at the one side of the edge of a recorded magnetic domain, but the jitter at the other side of the edge is unsatisfactory, resulting in a lower linear density of the recording.

SUMMARY OF THE INVENTION

An object of the present invention is to provide a method for reproducing magneto-optical information with less jitter and higher linear density.

Another object of the present invention is to provide an apparatus for the above method.

A further object of the present invention is to provide an information recording method for the above reproducing method.

According to an aspect of the present invention, there is provided a magneto-optical information reproducing apparatus for reproducing information by displacement of a domain wall of a magnetic domain recorded by mark-edge recording on a recording medium, comprising means for applying a magnetic field for reproduction, and means for extracting a signal produced by displacement of a domain wall of one of a front edge and a rear edge of a magnetic domain, wherein the extracted signal is taken for a reproduced signal.

According to another aspect of the present invention, there is provided a magneto-optical information reproducing apparatus for reproducing information by displacement of a domain wall of a magnetic domain recorded by mark-edge recording on a recording medium, comprising means for applying a magnetic field for reproduction; means for extracting a signal produced by displacement of a domain wall of one of a front edge and a rear edge of a magnetic domain, then reversing the direction of the magnetic field, and extracting a signal produced by displacement of the domain wall at the other edge; and means for synthesizing a signal produced by displacement of a domain wall at the front edge with a signal produced by displacement of a domain wall at the rear edge, wherein the synthesized signal is taken for a reproduced signal.

According to still another aspect of the present invention, there is provided a magneto-optical information reproducing method for reproducing information by displacement of a domain wall of a magnetic domain recorded by mark-edge recording on a recording medium, comprising applying a magnetic field for reproduction, and extracting a signal produced by displacement of a domain wall of one of a front edge and a rear edge of a magnetic domain, wherein the extracted signal is taken for a reproduced signal.

According to a further aspect of the present invention, there is provided a magneto-optical information reproducing method for reproducing information by displacement of a domain wall of a magnetic domain recorded by mark-edge recording on a recording medium, comprising applying a magnetic field for reproduction, extracting a signal produced by displacement of a domain wall of one of a front edge and a rear edge of a magnetic domain, then reversing the direction of the magnetic field, extracting a signal produced by displacement of the domain wall at the other edge, and synthesizing a signal produced by displacement of a domain wall at the front edge with a signal produced by displacement of a domain wall at the rear edge, wherein the synthesized signal is taken for a reproduced signal.

According to a still further aspect of the present invention, there is provided an information recording method for recording on a magneto-optical recording medium for reproducing information by displacement of a domain wall of a magnetic domain, comprising forming a magnetic domain having information on one of the front edge and the rear edge on the recording medium, and forming the other edge at about a middle position between the information-carrying edge of the magnetic domain and the information-carrying edge of an adjacent magnetic domain.

BRIEF DESCRIPTION OF THE DRAWINGS

FIGS. 3A, 3B, 3C, 3D, and 3E are drawings for explaining pit-position recording and pit-edge recording.

FIGS. 10A, 10B, 10C, 10D, 10E, 10F, 10G, 10H, 10I and 10J are drawings comprised of signal waveforms for explaining the operation in the embodiment shown in FIG. 9.

FIGS. 11A, 11B, 11C, 11D, 11E and 11F are drawings comprised of signal waveforms for explaining the operation in another embodiment of the present invention.

DESCRIPTION OF THE PREFERRED EMBODIMENTS

Embodiments of the present invention are described below by reference to the drawings.

Figure 1:
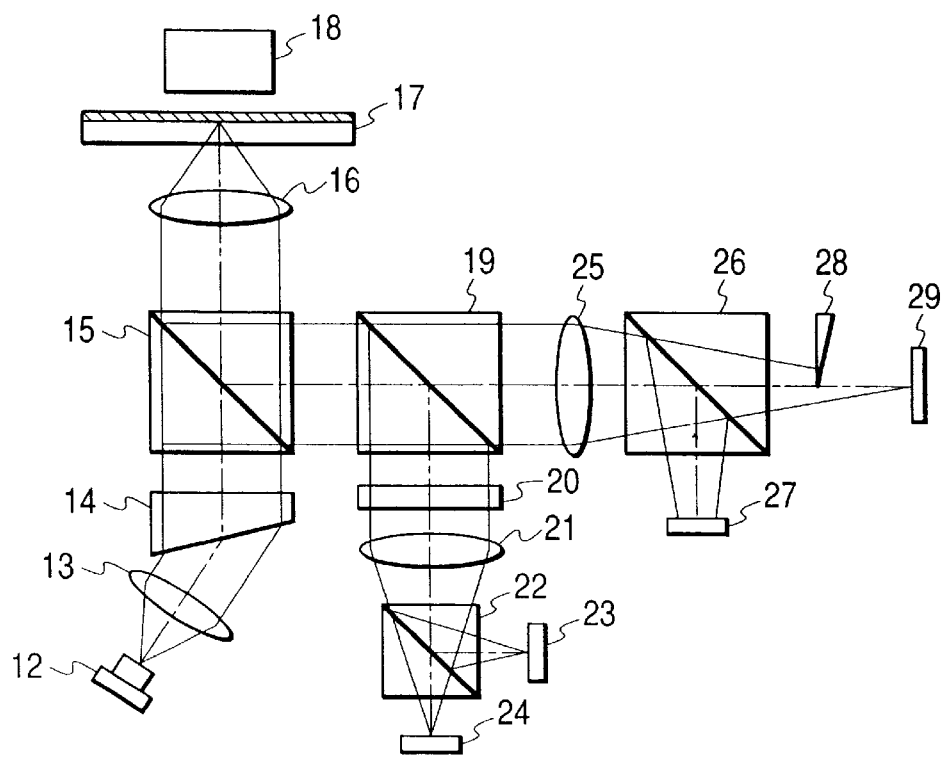
FIG. 1 illustrates a conventional one-beam optical head.
Figure 2:
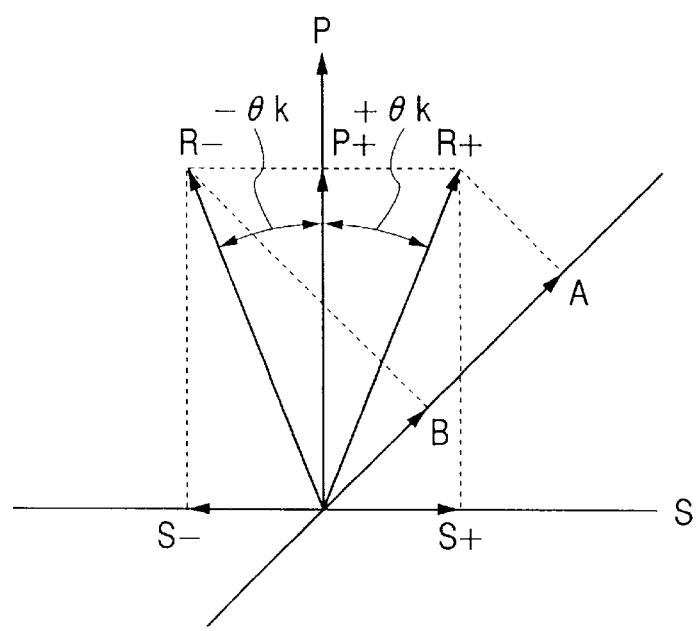
FIG. 2 is a drawing for explaining the principle of reproduction of a magneto-optical signal by differential detection.
Figure 4A:
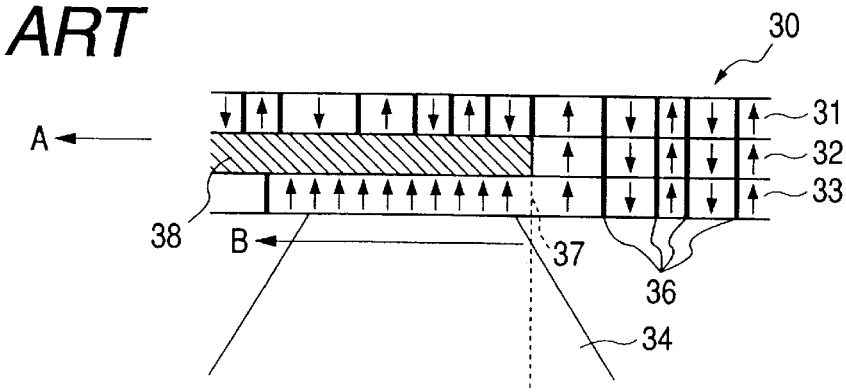
FIGS. 4A, 4B, 4C, and 4D are drawings for explaining reproduction by domain wall displacement.
Figure 4B:
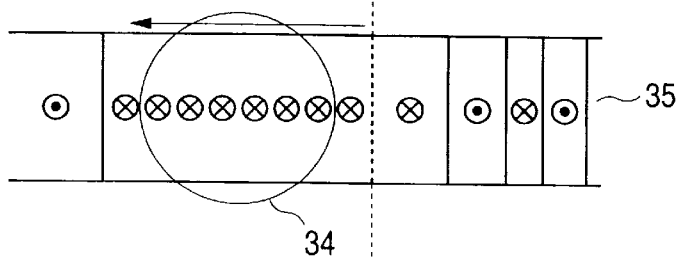
Figure 4C:
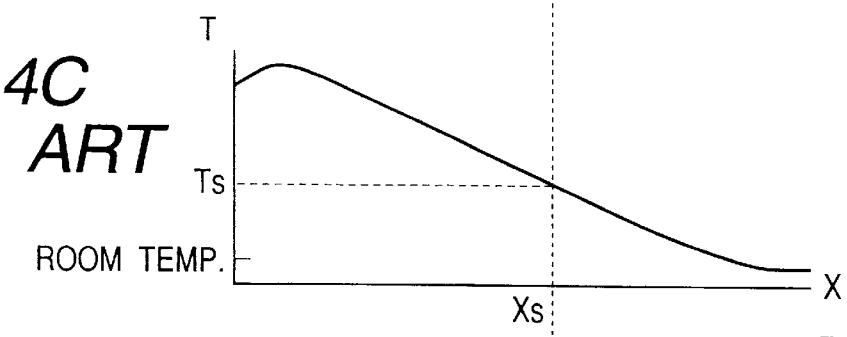
Figure 4D:
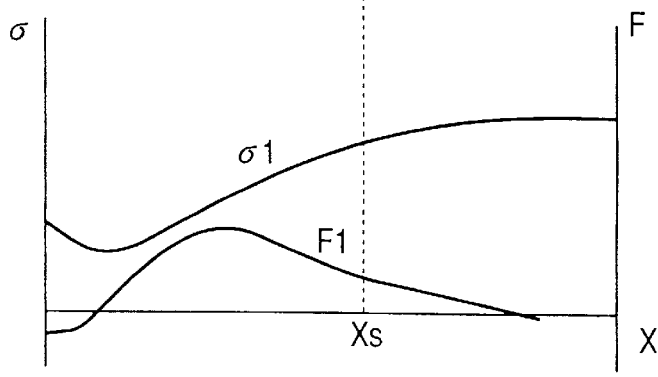
Figure 5:
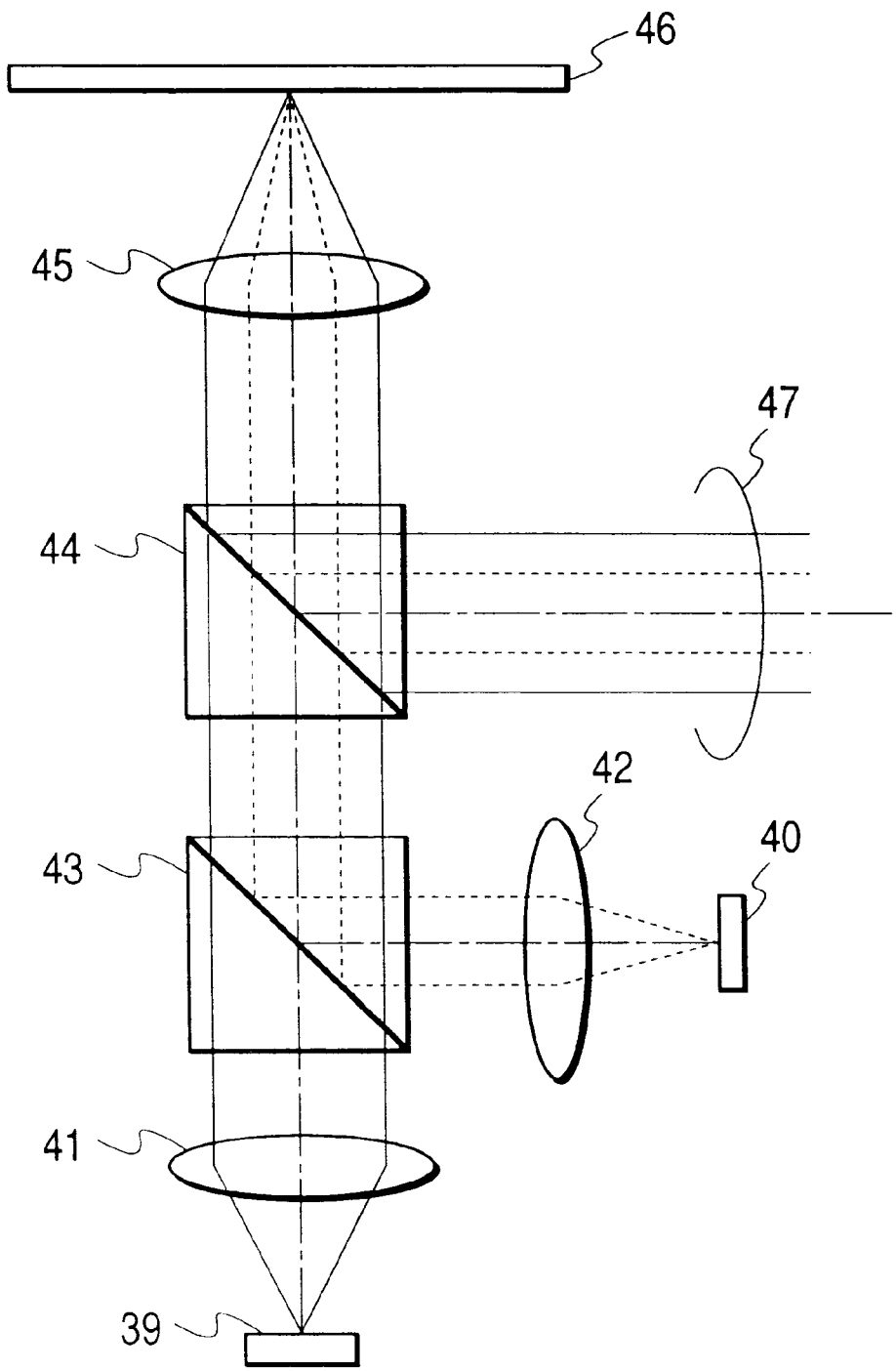
FIG. 5 illustrates an example of a two-beam optical head for reproduction by domain wall displacement.
Figure 6A:
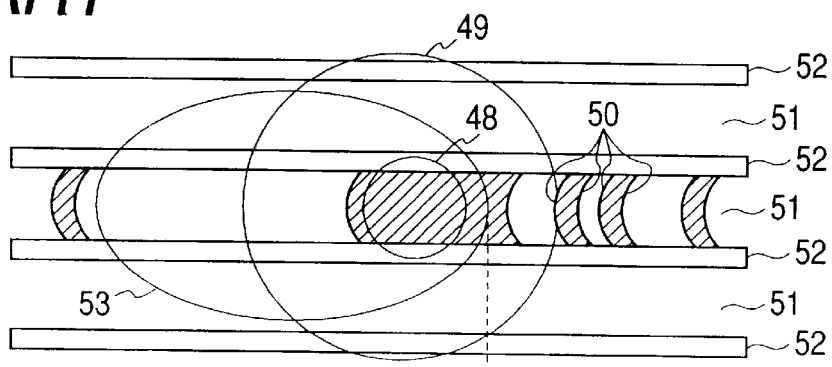
FIGS. 6A and 6B show temperature distribution on a medium in two-beam reproduction by domain wall displacement.
Figure 6B:
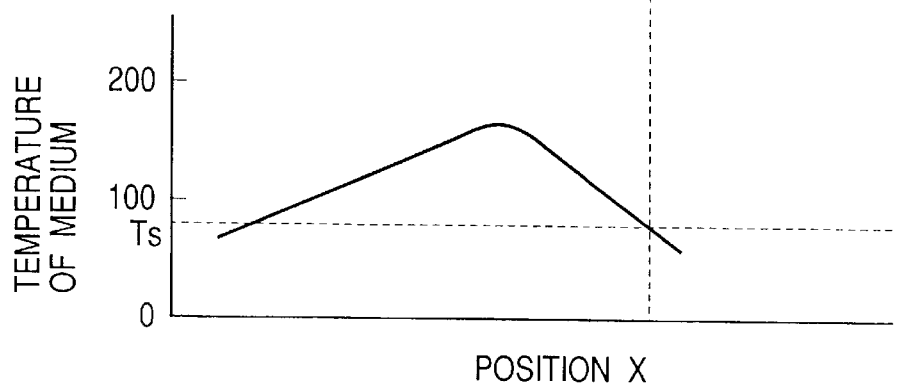
Figure 7A:
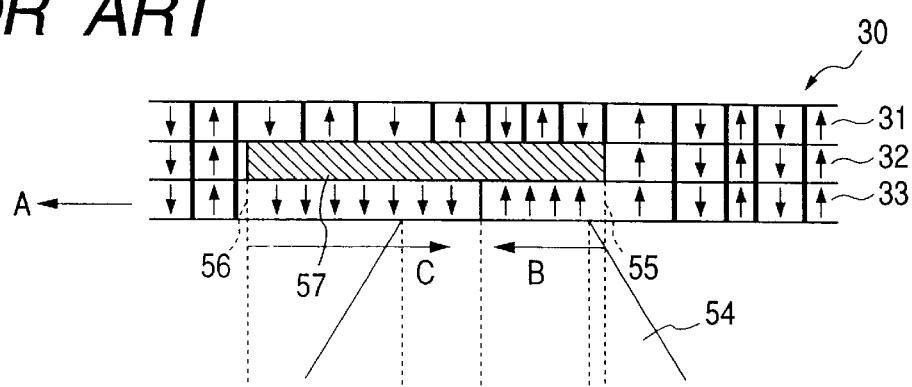
FIGS. 7A and 7B are drawings for explaining mechanism of one-beam reproduction by domain wall displacement.
Figure 7B:
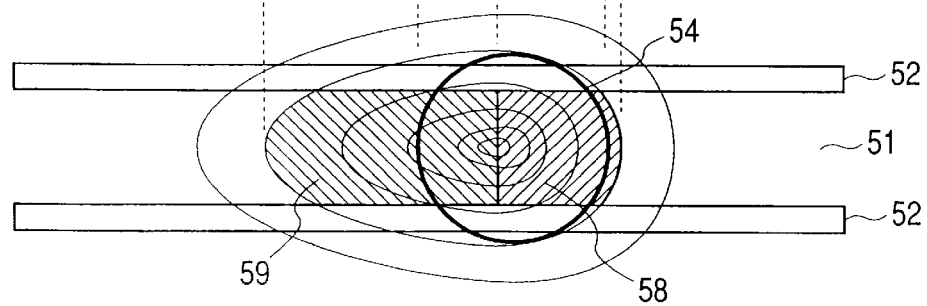
Figure 8A:
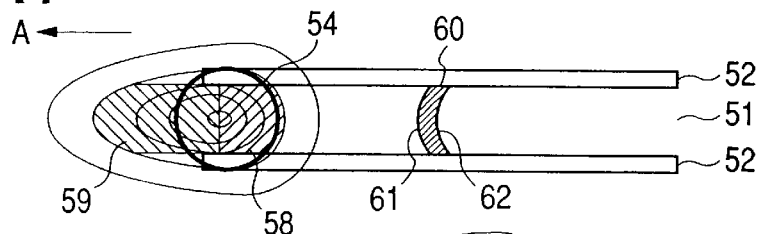
FIGS. 8A, 8B, 8C, 8D, 8E, 8F, and 8G are drawings for explaining problems in one-beam reproduction by domain wall displacement.
Figure 8B:
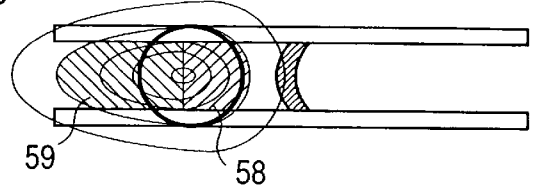
Figure 8C:
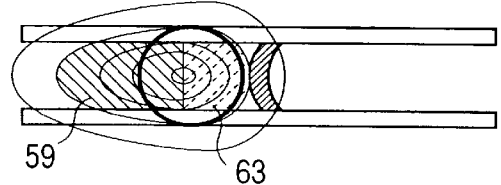
Figure 8D:
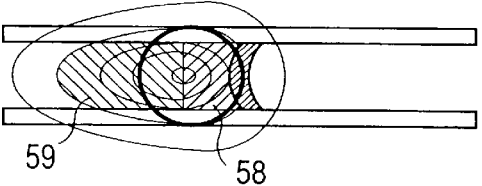
Figure 8E:
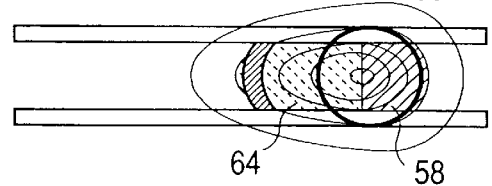
Figure 8F:
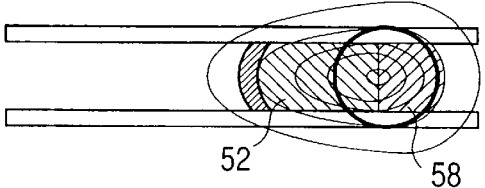
Figure 8G:
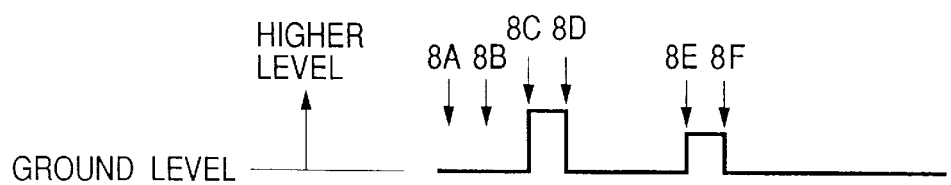
Figure 9:
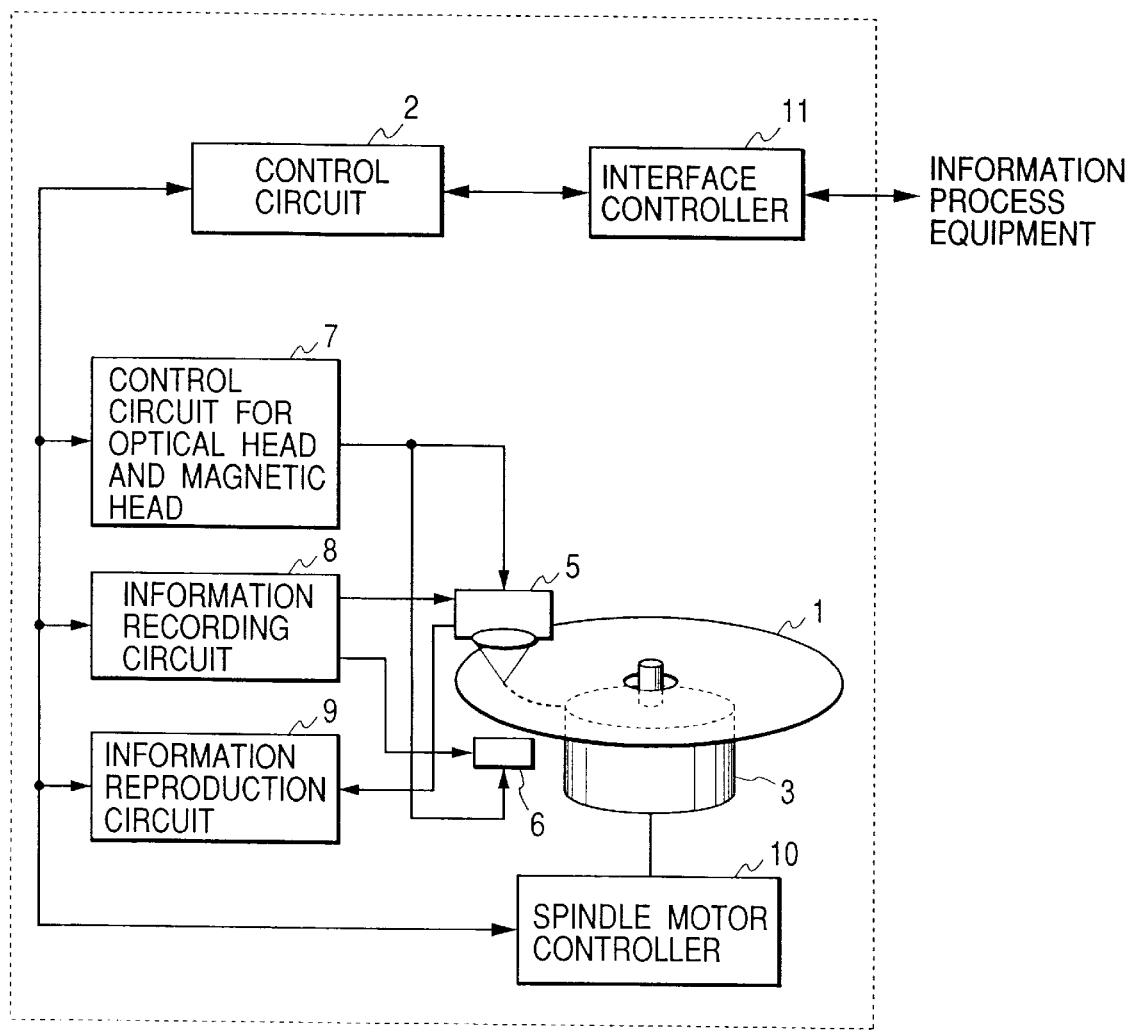
FIG. 9 illustrates the constitution of a magneto-optical information reproducing apparatus of the present invention.

FIG. 9 illustrates the constitution of a magneto-optical information reproducing apparatus of the present invention. The numeral 1 indicates a magneto-optical disk. Control circuit 2 controls transmission and reception of information to or from an outside information processor, such as a computer, and controls the recording and reproduction of information on magneto-optical disk 1, as well as other means. Spindle motor 3 drives magneto-optical disk 1 to rotate under the control of spindle motor controller 10. Magneto-optical disk 1 can be inserted into and taken out from the apparatus by a mechanism not shown in the drawing.

Optical head 5 optically records and reproduces information on or from magneto-optical disk 1. Magnetic head 6, which confronts optical head 5 with interposition of magneto-optical disk 1, applies a magnetic field on recording and reproduction. Control circuit 7 for the optical head and the magnetic head controls the position of the light spot projected by optical head 5 and the position of magnetic head 6 to control operations of auto-tracking, seeking, and auto-focusing. Numeral 8 indicates an information recording circuit for information recording. Numeral 9 indicates an information reproduction circuit for reproducing information. Numeral 11 indicates an interface controller.

Magneto-optical disk 1 employed in this embodiment is the same as the one described above by reference to in FIGS. 4A to 4D. This disk has at least three magnetic layers comprising memory layer (first magnetic layer) 31, switching layer (second magnetic layer) 32, and displacement layer (third magnetic layer) 33. Memory layer 31 records information as the magnetic domains. Switching layer 32 controls exchange coupling between memory layer 31 and displacement layer 33. Displacement layer 33 receives the transfer of the magnetic domains from memory layer 31 and further displaces the domain walls of the transferred magnetic domains by the function of switching layer 32 and the thermal distribution caused by a light spot, making larger the size of the magnetic domains than that recorded on memory layer 31.

The respective magnetic layers can be formed from an amorphous alloy composed of combination of one or more transition metals and one or more rare earth metals. The transition metals include Fe, Co, and Ni. The rare earth metals include Gd, Tb, Dy, Ho, Nd, and Sm. The typical combination is exemplified by TbFeCo, GdTbFe, GdFeCo, GdTbFeCo, and GdDyFeCo. A small amount of a metal such as Cr, Mn, Cu, Ti, Al, Si, Pt, and In may be added for improvement of corrosion resistance. Further, to the layer constitution, another metal layer of Al, AlTa, AlTi, AlCr, or Cu may be additionally formed to adjust the thermal properties. Optical head 5 is similar to the one-beam optical head shown in FIGS. 4A to 4D.

The operation of this embodiment is described by reference to FIGS. 10A to 10J. FIG. 10A shows recorded signals. FIG. 10B shows magnetic field-modulation signal modulated in correspondence with the recorded signal. The magnetic field-modulation signal is introduced to magnetic head 6. In information recording, instruction for recording is issued from an external information processor to the apparatus of FIG. 9, and the recording signal as shown in FIG. 10A is transmitted through interface controller 11 to the apparatus shown in FIG. 9. Control circuit 2, which has received the recording signal, controls optical-head and magnetic-head control circuit 7 to move optical head 5 and magnetic head 6 to the intended positions of the track. Then, control circuit 2 issues an instruction to information recording circuit 8 to control optical head 5 at the recording power level, and to produce the magnetic field-modulation signal of FIG. 10B and transmit it to magnetic head 6. Thereby, a light beam of a constant intensity is projected from optical head 5 to the intended track on magneto-optical disk 1, and a magnetic field modulated in correspondence with information signals is applied by magnetic head 6 to record arrow blade-shaped magnetic domains as shown in FIG. 10C on memory layer 31 of magneto-optical disk 1.

In this embodiment, the length of the respective magnetic domains is designed to be nearly constant and minimum for reproduction by the apparatus shown in FIG. 9, and the same information is recorded at both of the edges of the one magnetic domain. FIG. 10D shows the detected signals reproduced from the magnetic domains in FIG. 10C by a domain wall displacement reproduction system. FIG. 10E shows the detected edge signal indicating the edge positions derived from crossing points of the detecting signal and the slice level. FIG. 10F shows final domain wall displacement reproduction signal obtained from the detected edge signal shown in FIG. 10E by separating only the edge signal corresponding to the rising wave portion of the detected signal by masking or a like method.

In information reproduction, instruction to reproduce the information is transmitted from the external information processing apparatus through interface controller 11 to control circuit 2. On receiving this instruction for reproduction, control circuit 2 controls optical-head magnetic-head control circuit 7 and other circuits to move optical head 5 and magnetic head 6 onto the intended position of the track, issues instruction to optical head 5 to raise its power to the reproduction power level, and issues instructions to magnetic head 6 to apply a prescribed magnetic field. In this embodiment, the magnetic field is applied in the same direction as that of magnetization of the magnetic domain in FIG. 10C. Thereby, a light beam is projected at a prescribed intensity from light head 5 to the intended track on the optical disk, and a prescribed magnetic field is applied by magnetic head 6 to produce the detected signal as shown in FIG. 10D. This detected signal is transmitted to information reproduction circuit 9, where the detected edge signal of FIG. 10E is produced by detecting the cross point of the signal wave and the slice level. Further, the domain wall displacement reproduction signal as shown in FIG. 10F is produced by masking the detected edge signal of FIG. 10E at the rising portion of the detected signal shown in FIG. 10D and detecting only the position of the front edge of the blade-shaped magnetic domain.

In a specific example of selective detection of the front edges, the front edges are detected by differentiating the detected signal of FIG. 10D. FIG. 10J shows a signal derived by differentiating the detected signal of FIG. 10D. By differentiation, positive peak signal is obtained corresponding to the rising portion of the detection signal, and negative peak signal is obtained corresponding to the falling portion of the detection signal. To detect the front edges selectively, edge detection signal of FIG. 10E is taken at the portion where the differentiation signal of FIG. 10J is higher than the slice level of +V. Thereby, the domain wall displacement reproduction signal is obtained as shown in FIG. 10F.

In this embodiment, as described above, a magnetic field is applied in the same direction as that of magnetization of the magnetic domain to detect the front edge of the magnetic domain. In other words, the edges at the side of the domain wall of which displacement are detected by magnetic field application. Thereby, reproduction signal can be obtained with less jitter. In a separate experiment conducted by the inventors of the present invention, mark-edge recording was conducted to record information at the both edges of respective magnetic domains, and domain wall displacement reproduction was conducted under application of a magnetic field. As the results, at the smallest domain length of less than 0.2 µm, the jitter became remarkable, causing deterioration of the quality of the reproduction signal. On the other hand, in information reproduction in the embodiment of the present invention, edges at the displacement-promoted side are detected. In this information reproduction, even at the smallest domain length of less than 0.1 µm, reproduction signal could be obtained with less jitter, and the information could be recorded and reproduced at a higher density than conventional mark edge recording.

In the above embodiment, front edges of the magnetic domains are detected by application of a magnetic field in the same direction as that of the magnetic domains. However, the rear edges may be detected by application of a magnetic field in the direction opposite to the magnetization direction of the magnetic domain. In this method also, the domain wall edges of the displacement-promoted side are detected, so that the reproduction signal can be obtained with less jitter. Although in the above embodiment, information is recorded at both edges of the respective magnetic domains, the information may be recorded on one of the edges of the respective magnetic domain. In this case also, the domain wall edges of the displacement-promoted side are detected, so that the reproduction signal can be obtained with less jitter.

In the above embodiment, information is reproduced by detecting the front edges by application of an external magnetic field in the same direction as the magnetization direction of the magnetic domain. When an error is caused by a defect of the medium or the like, the information can be reproduced by reversing the direction of the external magnetic field to detect the edges of the other edge of the magnetic domain. Thereby a small defect of the medium can be offset. FIG. 10G shows the detecting signal obtained by reversing the magnetic field. FIG. 10H shows detected edge signal derived by detecting the edge positions from cross points of the detecting signal of FIG. 10G and the slice level. FIG. 10I shows domain wall displacement reproduction signal obtained finally by separating only the edge signal corresponding to falling portion of the waveform of the detecting signal of FIG. 10G by masking or a like method. The signal is obtained in the same manner as in FIGS. 10D, 10E, and 10F. The domain wall displacement reproduction signal can be obtained, as described above by differentiating the detection signal. In this case, by detecting the edge detection signal of FIG. 10H at the position where the signal wave is lower than −V, the domain wall displacement reproducing signal can be derived as shown in FIG. 10I.

Another embodiment of the present invention is described below.

In the embodiment shown in FIGS. 10A to 10J, the same information is recorded at both edges of the domain. However, different information may be recorded separately at the respective edges of one domain in the mark-edge recording, if the reproduction time may doubled. In this information reproduction, firstly, the information recorded at the front edges is reproduced by domain wall displacement reproduction under application of a magnetic field in the same direction as that of the magnetic domains, subsequently information recorded at the rear edges is reproduced under application of a magnetic field in the reversed direction, and the information at both edges is synthesized to reproduce the final information. Thereby, the recording and reproduction can be conducted at a higher recording density.

Still another embodiment of the present invention is now described. In this embodiment, in information recording, information is recorded only at the front edges, and the rear edges are located respectively at approximately the middle point between the front edge of the same magnetic domain and the front edge of the next magnetic domain. FIG. 11A shows recorded information. FIG. 11B shows a magnetic field modulation signal introduced to magnetic head 6. A light beam is projected at a prescribed intensity from optical head 5 onto magneto-optical disk 1, and a magnetic field is applied from magnetic head 6 in accordance with the magnetic field modulation signal of FIG. 11B. Thereby, magnetic domains are formed in the shape of an arrow blade on memory layer 31 on magneto-optical disk 1. As described above, the magnetic domains have information at the front edges, and the rear edges are located at the middle points between the front edge of the same magnetic domain and the front edge of the next magnetic domain.

By recording in such a manner, information can be recorded in a larger magnetic domain in average. Thereby, recording can be made with less adverse effect of defect of the medium. Moreover, the recording density can be increased, since information is recorded only at the front edges, and the rear edges are located respectively at approximately the middle point between the front edge of the same magnetic domain and the front edge of the next magnetic domain. FIG. 11D shows the detection signal of the magnetic domains of FIG. 11C reproduced by domain wall displacement reproduction. FIG. 11E shows the edge detection signal derived from the detection of the positions where the detection signal of FIG. 11D traverses the slice level. FIG. 11F shows the final domain wall displacement reproduction signal obtained from the detected edge signals shown in FIG. 11E by separating the edge signals corresponding to the rising wave portions of the detection signal by masking or a like method. The recording method of this embodiment is applicable to any magneto-optical recording apparatus irrespectively of the magneto-optical recording method and the domain wall displacement method.

As described above, the present invention has advantages below.

(1) Recording and reproduction are conducted at a higher density, since the information is reproduced by detection of the domain wall edges of the displacement-promoted side with less jitter even with a smaller magnetic domain length.

(2) Further, higher density of recording and reproduction can be achieved by reproduction of information by detecting both edges of the respective magnetic domains and synthesizing the obtained information of both edges.

(3) Recording can be conducted with less adverse effect of the medium with higher recording density by recording information at either the front edges or the rear edges, and locating the other edges respectively, at the middle point between the information-carrying edge and the adjacent edge to record information in larger magnetic domains in average.

What is claimed is:

1. A magneto-optical information reproducing apparatus for reproducing information by displacement of a domain wall of a magnetic domain recorded by mark-edge recording on a recording medium, comprising:

means for applying a magnetic field for reproduction;

means for extracting only a signal produced by displacement of a domain wall of either a front edge or a rear edge of a magnetic domain, wherein the extracted signal is taken as a reproduced signal.

2. The magneto-optical information reproducing apparatus according to claim 1, wherein the extracted signal is derived from the displacement of the domain wall which is promoted by the magnetic field for reproduction.

3. The magneto-optical information reproducing apparatus according to claim 2, wherein information is recorded on either the front edge or the rear edge of the magnetic domain.

4. The magneto-optical information reproducing apparatus according to claim 2, wherein both the front edge and the rear edge of the magnetic domain have the same information, and when an error occurs in reproduction, the direction of the magnetic field for reproduction is reversed, and the extracted signal is derived from displacement of the domain wall which is promoted by the reversed magnetic field.

5. The magneto-optical information reproducing apparatus according to claim 1, wherein the displacement of the domain wall is caused by temperature gradient formed by a light beam projected onto the recording medium.

6. A magneto-optical information reproducing apparatus for reproducing information by displacement of a domain wall of a magnetic domain recorded by mark-edge recording on a recording medium, comprising:

means for applying a magnetic field for reproduction;

means for extracting only a signal produced by displacement of a domain wall which is promoted by the magnetic field, then reversing the direction of the magnetic field, and extracting only a signal produced by displacement of a domain wall which is promoted by the reversed magnetic field; and means for synthesizing the extracted signals, wherein the synthesized signal is taken as a reproduced signal.

7. An information recording method for recording on a magneto-optical recording medium for reproducing information by displacement of a domain wall of a magnetic domain, comprising the steps of:

forming a magnetic domain having information on either a front edge or a rear edge on the recording medium; and forming an edge of the magnetic domain having no information at about a middle position between the edge of the magnetic domain having information and an edge having information of an adjacent magnetic domain.

8. A magneto-optical information reproducing method for reproducing information by displacement of a domain wall of a magnetic domain recorded by mark-edge recording on a recording medium, comprising the steps of:

applying a magnetic field for reproduction; and extracting only a signal produced by displacement of a domain wall of either a front edge or a rear edge of a magnetic domain, wherein the extracted signal is taken as a reproduced signal.

9. A magneto-optical information reproducing method for reproducing information by displacement of a domain wall of a magnetic domain recorded by mark-edge recording on a recording medium, comprising the steps of:

applying a magnetic field for reproduction;

extracting only a signal produced by displacement of a domain wall which is promoted by the magnetic field;

reversing the direction of the magnetic field;

extracting only a signal produced by displacement of a domain wall which is promoted by the reversed magnetic field; and synthesizing the extracted signals, wherein the synthesized signal is taken as a reproduced signal.

* * * * *

UNITED STATES PATENT AND TRADEMARK OFFICE
CERTIFICATE OF CORRECTION

PATENT NO. : 6,104,676
DATED : August 15, 2000
INVENTOR(S) : Masakuni Yamamoto

It is certified that error appears in the above-identified patent and that said Letters Patent is hereby corrected as shown below:

Column 1,
Line 14, "for" should read -- for recording -- and "produced" should read -- reproduced --.

Column 3,
Line 17, "layer" should read -- layer, -- (second occurrence)

Column 4,
Line 54, "fluxes" should read -- flux --.

Column 6,
Line 17, "reach" should read -- reached --.

Column 9,
Line 21, "by reference to" should read -- referenced --.

Column 10,
Line 64, "the" should be deleted.
Line 67, "the results," should read -- a result --.

Column 12,
Line 55, "in" should read -- on --.
Line 61, "reproduction;" should read -- reproduction; and --.

Signed and Sealed this

Ninth Day of October, 2001

Attest:

NICHOLAS P. GODICI
*Attesting Officer*   *Acting Director of the United States Patent and Trademark Office*